United States Patent
Windecker et al.

(10) Patent No.: US 9,216,672 B2
(45) Date of Patent: Dec. 22, 2015

(54) INDICATOR APPARATUS

(76) Inventors: Volker Windecker, Sippersfeld (DE);
Stefan Haber, Pirmasens (DE); Denise Buettler, Worms (DE); Kadir Yasaroglu, Kaiserslautern (DE); Bernd Heimann, Reiffelbach (DE); Tobias Braun, Lambsheim (DE); Peter Muller, Mackenbach (DE)

( * ) Notice: Subject to any disclaimer, the term of this patent is extended or adjusted under 35 U.S.C. 154(b) by 484 days.

(21) Appl. No.: 13/511,308

(22) PCT Filed: Nov. 22, 2010

(86) PCT No.: PCT/EP2010/007062
§ 371 (c)(1),
(2), (4) Date: May 22, 2012

(87) PCT Pub. No.: WO2011/063920
PCT Pub. Date: Jun. 3, 2011

(65) Prior Publication Data
US 2012/0227660 A1   Sep. 13, 2012

(30) Foreign Application Priority Data
Nov. 25, 2009  (DE) .......................... 10 2009 056 155

(51) Int. Cl.
*B60N 2/02* (2006.01)
*B60N 2/36* (2006.01)

(52) U.S. Cl.
CPC ...................................... *B60N 2/366* (2013.01)

(58) Field of Classification Search
USPC .......................... 297/378.13, 378.12, 378.14
See application file for complete search history.

(56) References Cited

U.S. PATENT DOCUMENTS 5,586,808 A * 12/1996 Oelke ........................... 297/287
5,829,831 A * 11/1998 Sharman .................. 297/378.12
6,312,055 B1 * 11/2001 Uematsu .................. 297/378.13
(Continued)

FOREIGN PATENT DOCUMENTS

DE  10 2004 045 988 B3  12/2005
DE     101 42 486 B4    12/2005
(Continued)

OTHER PUBLICATIONS

International Search Report for application No. PCT/EP2010/007062 mailed Mar. 18, 2011.
(Continued)

*Primary Examiner* — David R Dunn
*Assistant Examiner* — Alexander Harrison
(74) *Attorney, Agent, or Firm* — Fletcher Yoder, P.C.

(57) ABSTRACT

An indicator apparatus for signaling that a foldable backrest of a seat in a motor vehicle is not locked includes a handle pivoted between a locked position and an unlocked position about a pivot axis, a locking apparatus having a catch that, by working of the handle can be moved between a blocked position and an unblocked position, and an indicator element guided between a non-indication position and an indication position and movable by a transition element. The transmission element comprises a spring element that is fixedly connected both to the handle and to the indicator element. The spring element is resistant to deformation as the indicator element is moved by the handle, but can be deformed in an elastic manner when the handle is located in the unlocked position and the indicator element is moved out of the indication position into the non-indication position.

10 Claims, 5 Drawing Sheets

(56) References Cited

U.S. PATENT DOCUMENTS

| | | | |
|---|---|---|---|
| 7,226,129 B2 * | 6/2007 | Brandes et al. | 297/378.13 |
| 7,416,254 B2 * | 8/2008 | Jennings | 297/378.12 |
| 2006/0061184 A1 * | 3/2006 | Jennings | 297/378.12 |
| 2007/0200411 A1 * | 8/2007 | Inoue et al. | 297/378.13 |
| 2011/0006576 A1 * | 1/2011 | Muller et al. | 297/378.13 |
| 2011/0006577 A1 * | 1/2011 | Muller et al. | 297/378.13 |
| 2011/0012415 A1 * | 1/2011 | Muller et al. | 297/378.13 |

FOREIGN PATENT DOCUMENTS

| | | |
|---|---|---|
| DE | 10 2004 052 746 B3 | 4/2006 |
| DE | 10 2007 060 922 A1 | 3/2009 |
| JP | 08-11-010 | 5/1996 |
| JP | 2001-097099 | 4/2001 |
| JP | 2004-042863 | 2/2004 |
| JP | 2006-089027 | 4/2006 |
| WO | 2010003587 A1 | 1/2010 |

OTHER PUBLICATIONS

Japanese Office Action received Jul. 30, 2013.

* cited by examiner

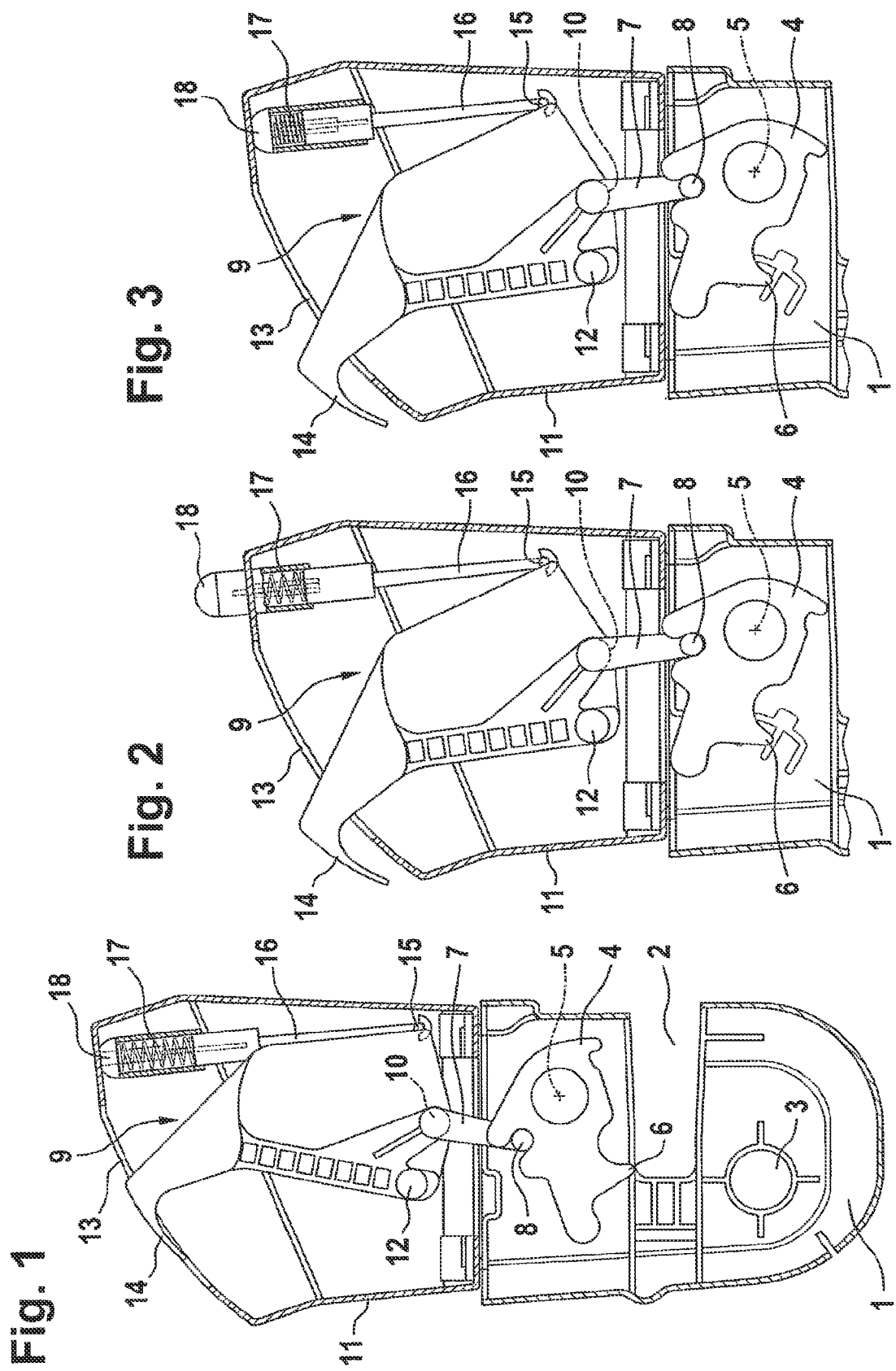

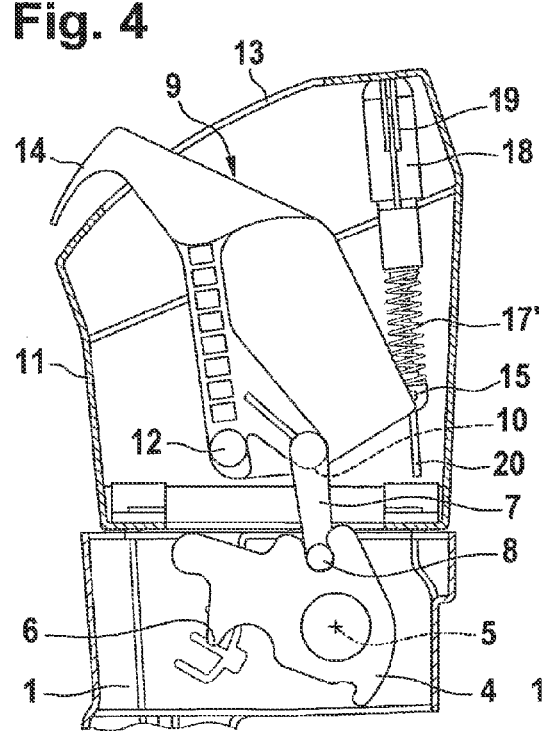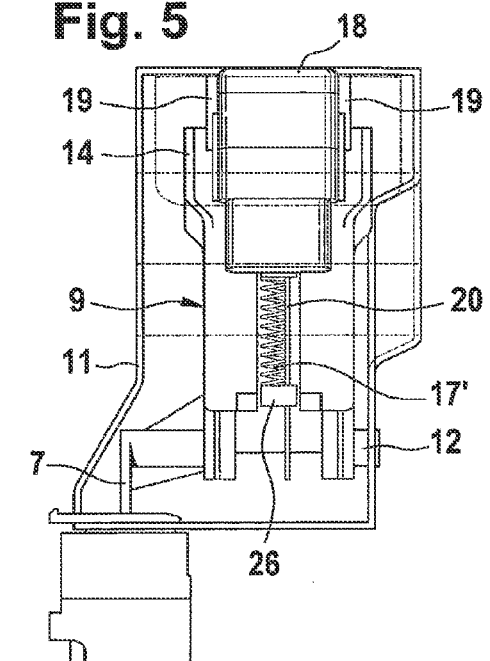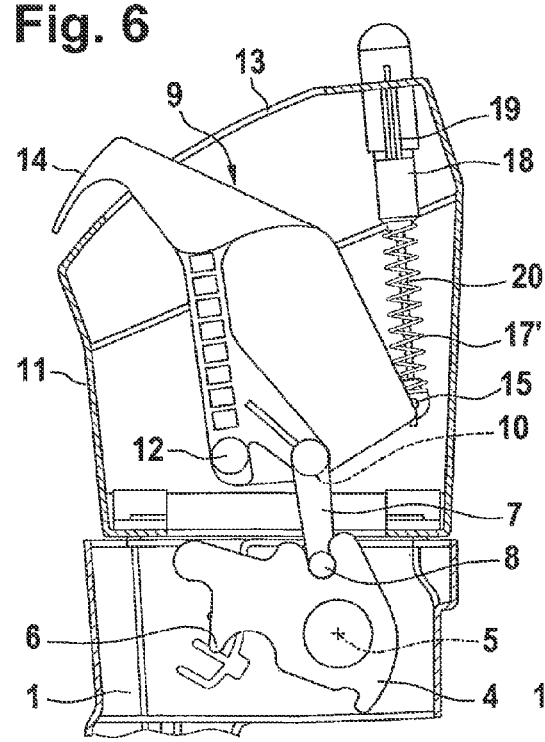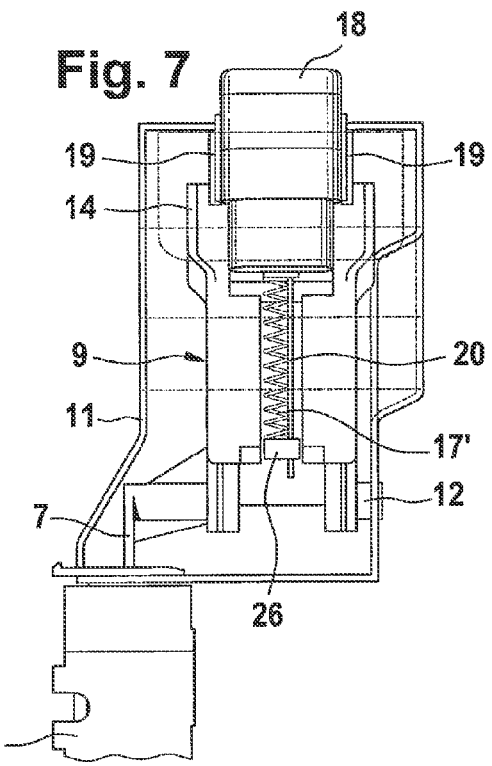

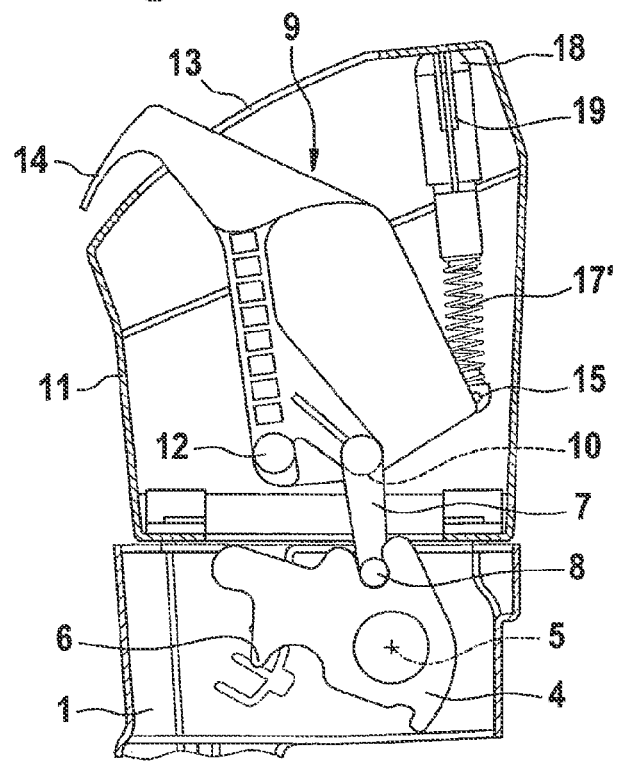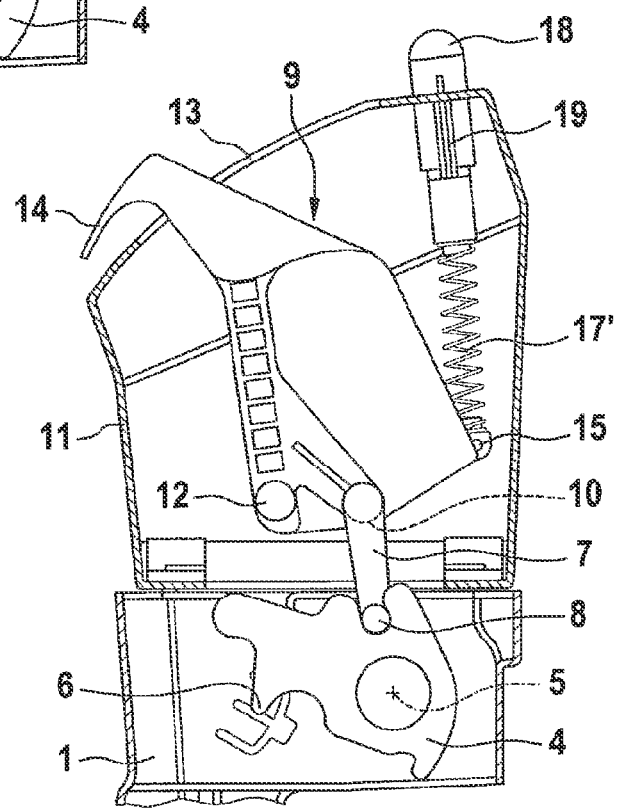

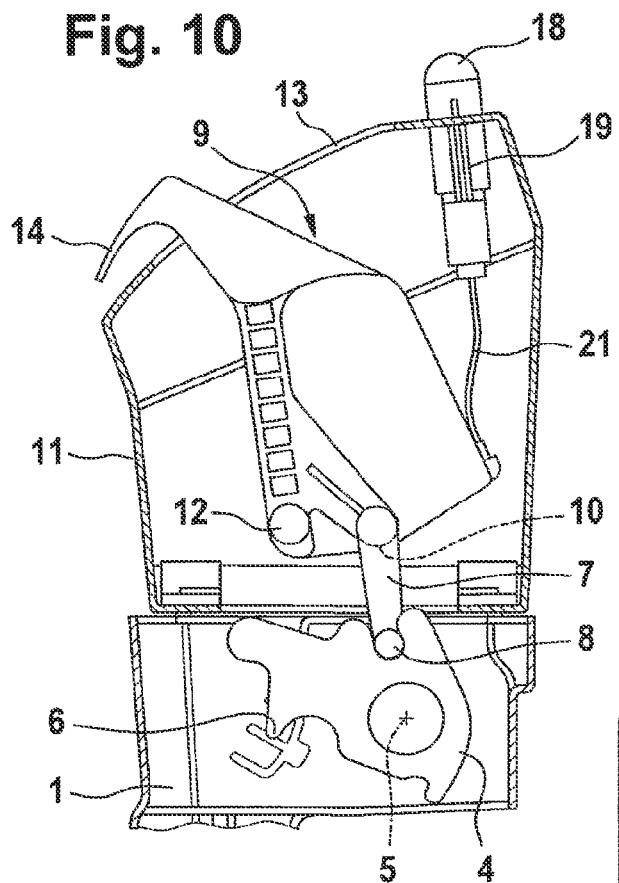
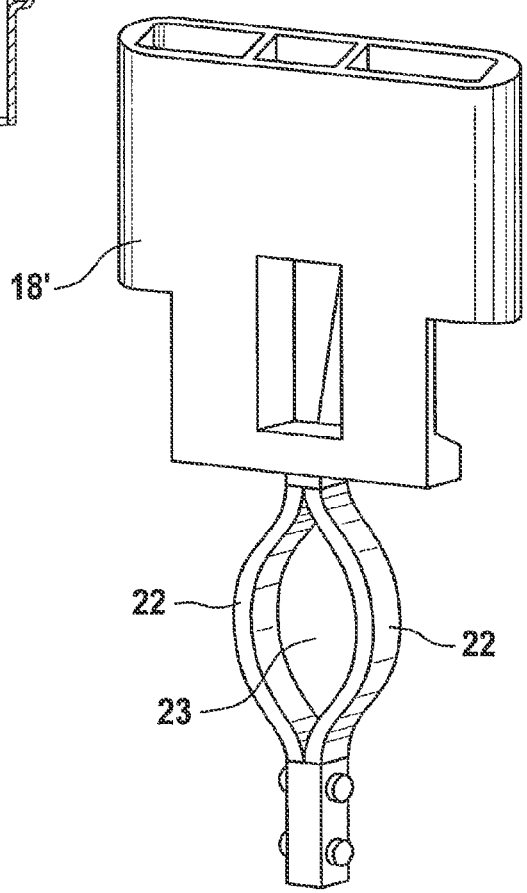

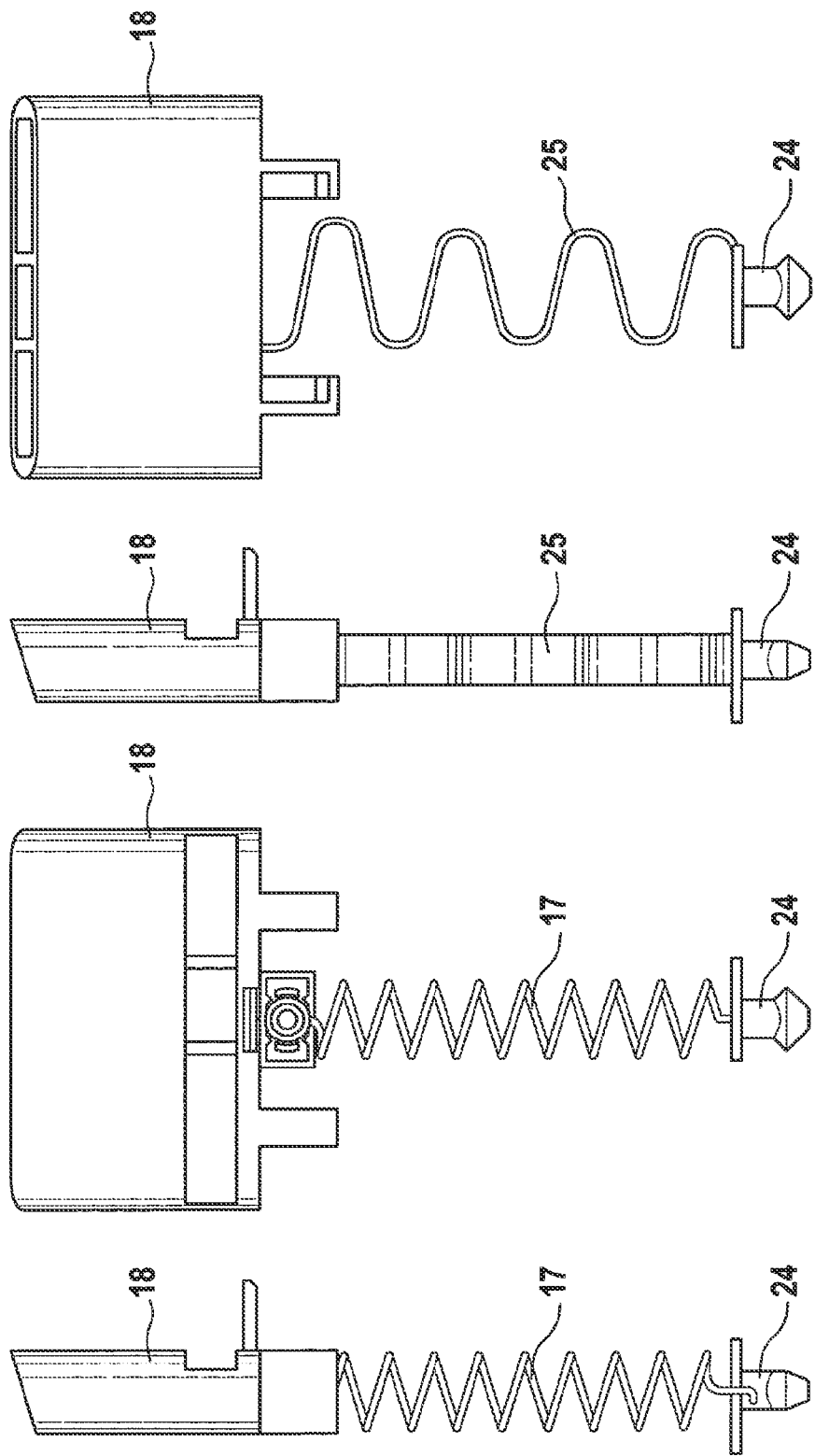

INDICATOR APPARATUS

CROSS REFERENCE TO RELATED APPLICATIONS

This application claims priority from and the benefit of PCT Application No. PCT/EP2010/007062, filed on Nov. 22, 2010 and German Patent DE 10 2009 056 155.2, filed on Nov. 25, 2009; both entitled "Indicator Apparatus", which are herein incorporated by reference.

BACKGROUND

The invention relates to an indicator apparatus for signaling that a foldable backrest of a seat, in particular a rear seat in a motor vehicle, is not locked, having a handle that can be pivoted between a locked position and an unlocked position about a pivot axis and by means of which handle a catch of a locking apparatus can be carried along between a blocked position and an unblocked position and by means of a transmission element an indicator element, which is guided in a guide between a non-indication position in which it is recessed in the guide and an indication position in which it protrudes outward partially out of the guide, can be moved in a displaceable manner, wherein the indicator element can be moved against a spring force into its non-indication position by the application of force to its outer end region that protrudes out of the guide when the handle is located in the unlocked position.

Indicator apparatuses of this type are used, in particular in the case of passenger vehicles that have foldable backrests of the rear seat, to indicate that the locking apparatus of said backrest is not in its correct latched position, which would mean that there is a risk of the backrest folding forwards in the event of any deceleration during the driving operation, in particular during a brake application.

It is known in the case of an indicator apparatus of this type that the indicator element can be moved by the handle from its non-indication position into its indication position by means of a spring.

The indicator element can be moved in the opposite direction from the indication position into the non-indication position in a positive-locking manner by the handle.

This type of movement of the indicator element requires a costly construction.

SUMMARY

The object of the invention is therefore to provide an indicator apparatus of the type mentioned in the introduction that is of a simple construction and requires a small amount of expenditure with regard to its assembly.

This object is achieved in accordance with the invention by virtue of the fact that the transmission element is a spring element fixedly connected both to the handle and also to the indicator element, which spring element is resistant to deformation in the event of the indicator element being moved in a displaceable manner by the handle and which spring element can be deformed in an elastic manner when the handle is located in the unlocked position and the indicator element is moved out of the indication position into the non-indication position.

The spring element fulfills a three-fold function by virtue of this embodiment, in that it moves the indicator element in a displaceable manner both from the non-indication position into the indication position and also from the indication position into the non-indication position.

Furthermore, when an external force is applied to the indicator element, it moves from the indication position into the guide, without the handle being actuated in the process.

This prevents the protruding indicator element from injuring any passengers and also causes it to deflect in the event of any other force being applied, so that the operating safety of the indicator apparatus is increased.

The spring element can be deformed in an elastic manner reducing its length between its connection points on the indicator element and handle and can engage the handle at a radially spaced disposition with respect to the pivot axis.

It is, however, also possible that the spring element is a resilient arm that is attached to the handle and is arranged at least approximately in a radial manner with respect to the pivot axis of the handle and contacts the indicator element with its other end in a transverse manner with respect to the direction of movement of the indicator element.

In a simple embodiment, the spring element can be a push/pull rod that can be deflected in an elastic manner transversely with respect to its longitudinal extension, which push/pull rod can be a resilient wire or leaf spring or also an elastomer rod.

In the case of a normal outward or inward movement of the indicator element, the rigidity of the push/pull rod means that this will not deform.

If an external force is applied to the indicator element in its indication position, the rigidity of the push/pull rod is overcome and this is deflected in an elastic manner transversely with respect to its longitudinal extension to form a curve, so that the indicator element can move into the guide and is protected therein.

Alternatively, the spring element can be a meander spring element manufactured in a resilient-elastic material, in particular from a meandering leaf spring.

If an external force is applied, the meander element is compressed in a manner that reduces its length, so that the indicator element can move into the guide.

The embodiment as a meandering leaf spring prevents the meander element from buckling to the side.

A further embodiment resides in the fact that the spring element is a helical compression spring.

In order to prevent the helical compression spring from buckling, the indicator element can comprise a guide rod that extends completely or partially in an approximately coaxial manner through the windings of the helical compression spring or in parallel with the helical compression spring.

It is, however, also possible that the spring element comprises two mutually approximately symmetrical bending rods that are fixedly connected to each other at their two end regions and in the middle region of their longitudinal extension said bending rods are spaced apart from each other forming an ear shape.

In order to facilitate a simple and rapid assembly process without requiring additional connecting elements, the spring element can be connected to the handle and/or the indicator element by a clip connection.

In order to provide protection against external influences and damage, the indicator apparatus can be arranged in a housing that comprises the guide of the indicator element.

The spring element can be manufactured in a simple and cost-effective manner if the spring element is an injection molded part manufactured in a resilient-elastic synthetic material.

An additional cost reduction and a simplification of the assembly process is achieved by virtue of the fact that the spring element and indicator element are embodied in one piece.

In order to reduce the size of the spring element, the handle-side end of the spring element can be connected by means of a push/pull element to the handle.

The push/pull element can be aligned during a pivot movement of the handle to suit the respective position of the handle if the push/pull element is articulated on the handle in such a manner as to be able to pivot about an articulated joint axis that is parallel with respect to the pivot axis of the handle.

The indicator element can be embodied preferably in the manner of a cylinder or also a flat slide.

In order to make the indicator element more easily noticeable for the passengers of the motor vehicle, it is preferably completely or partially in a warning color, such as for example red.

If the indicator element can be deformed in an elastic manner transversely with respect to its direction of movement, then it can deflect substantially in a transverse manner with respect to its direction of displacement in the guide and avoid damage, even in the event of an external force being applied.

DRAWINGS

Exemplary embodiments of the invention are described in further detail hereinbelow and are illustrated in the drawing, in which:

FIG. 1 shows a lateral view of a locking apparatus in a blocked position with an indicator apparatus in a non-indication position, FIG. 2 shows a lateral view of the locking apparatus as shown in FIG. 1 in an unblocked position with the indicator apparatus in an indication position, FIG. 3 shows a lateral view of the locking apparatus as shown in FIG. 1 in the unblocked position with the indicator apparatus in the non-indication position, FIG. 4 shows a lateral view of the locking apparatus as shown in FIG. 1 in the unblocked position with a second exemplary embodiment of an indicator apparatus in the non-indication position, FIG. 5 shows a frontal view of the locking apparatus and indicator apparatus as shown in FIG. 4, FIG. 6 shows a lateral view of the locking apparatus as shown in FIG. 1 in the unblocked position with the indicator apparatus as shown in FIG. 4 in the indication position, FIG. 7 shows a frontal view of the locking apparatus and indicator apparatus as shown in FIG. 6, FIG. 8 shows a lateral view of the locking apparatus as shown in FIG. 1 in the unblocked position with a third exemplary embodiment of an indicator apparatus in the non-indication position, FIG. 9 shows a lateral view of the locking apparatus as shown in FIG. 1 in the unblocked position with the indicator apparatus as shown in FIG. 8 in the indication position, FIG. 10 shows a lateral view of the locking apparatus as shown in FIG. 1 in the unblocked position with a fourth exemplary embodiment of an indicator apparatus in the indication position, FIG. 11 shows a perspective view of the indicator element and spring element of a fifth exemplary embodiment of an indicator apparatus, FIG. 12 shows a lateral view of the indicator element and spring element of the indicator apparatus of FIGS. 8 and 9, FIG. 13 shows a frontal view of the indicator element and spring element of the indicator apparatus of FIGS. 8 and 9, FIG. 14 shows a lateral view of the indicator element and spring element of a sixth exemplary embodiment of an indicator apparatus, FIG. 15 shows a frontal view of the indicator element and spring element of the indicator apparatus as shown in FIG. 14.

DETAILED DESCRIPTION

The locking apparatuses illustrated in the figures comprise a locking apparatus housing half 1 of a locking apparatus housing, which locking apparatus housing half comprises an entry slot 2 that is open at the edge side, through which entry slot a locking pin (not illustrated), which is arranged fixed to a chassis part of a motor vehicle, can be inserted in a transverse manner.

A pawl (not illustrated) is pivotably mountable in a bearing hole 3 and when the pawl is in the locked position the locking pin that is inserted into the entry slot 2 is captured by said pawl.

The pawl comprises an approximately radially protruding shoulder for securing the pawl in the locked position, which shoulder can be engaged from behind by a detent 6 of a catch 4 when the pawl is in the locked position.

The catch 4 can pivot in the locking apparatus housing half 1 about a pivot axis 5 between a blocked position (FIG. 1) and an unblocked position (FIGS. 2 to 10).

One end of a link 7 is connected in an articulated manner to the catch 4 in such a manner as to be able to pivot about a first axis 8, which is parallel with the pivot axis 5. The other end of said link is connected in an articulated manner to a handle 9 in such a manner as to be able to pivot about a second axis 10.

The handle 9 is mounted in a housing 11, which is connected to the locking apparatus half 1, in such a manner as to be able to pivot about a second pivot axis 12 that is parallel with the second axis 10. Said handle 9 comprises a grip 14 that protrudes outward through an opening 13 in the housing 11, by means of which grip the handle 9 can be pivoted manually between a locked position (FIG. 1) and an unlocked position (FIGS. 2-10), wherein the catch 4 can be pivoted between the blocked position and the unblocked position.

A transmission element of an indicator apparatus is attached to the handle 9 at a radially spaced disposition with respect to the second pivot axis 12.

In the case of the exemplary embodiment of FIGS. 1 to 3, a push/pull element 16 is connected at one of its ends in an articulated manner to the handle 9 by means of an articulated joint axis 15 and extends in an approximately tangential manner with respect to the pivot movement of the articulated joint axis 15 about the second pivot axis 12 with respect to a helical compression spring 17, which is connected at one of its ends to the end of the push/pull element 16 that faces said helical compression spring and extends in the direction of longitudinal extension of the push/pull element 16.

The other end of the helical compression spring 17 is connected to a flat slide-type indicator element 18 that is guided in a displaceable manner in a guide 19 that is arranged in the housing 11.

Here, the guide 19 is open towards the outside of the housing 11.

The embodiment of the indicator element 18 and guide 19 is identical in all the illustrated exemplary embodiments of the indicator apparatus of FIGS. 1 to 10.

In the exemplary embodiments of FIGS. 4 to 7, the transmission element is a helical compression spring 17' that is connected at one of its ends by means of an articulated joint axis 15 to the handle 9 and at its other end is connected to the end of the indicator element 18 that is directed into the housing 11.

The indicator element 18 comprises a guide rod 20 that is arranged in an axial manner with respect to the guide 19 and extends in parallel with and adjacent to the helical compression spring 17' and penetrates a guide lug 26 on the handle 9 in the region of the articulated joint axis 15.

The exemplary embodiment of FIGS. 8 and 9 of the indicator apparatus corresponds to the exemplary embodiment of FIGS. 4 to 7 with the exception that no guide rod 20 is present.

In the exemplary embodiment of FIG. 10, the transmission element is a push/pull rod that is embodied as a leaf spring 21, extends approximately in the direction of extension of the guide 19 and can be deflected in an elastic manner transversely with respect to its longitudinal extension.

The leaf spring 21 is fixedly connected at one of its ends to the indicator element 18 and at its other end to the handle 9.

The exemplary embodiment of an indicator element 18' illustrated in FIG. 11 with the transmission element is embodied in one piece as an injection molded part. Here, the transmission element is a spring element comprising two mutually almost symmetrical bending rods 22, which are fixedly connected to each other at their two end regions and as a consequence are flexurally rigid. In the middle region of their longitudinal extension said bending rods are spaced apart from each other forming an ear shape 23 and are flexible in an elastic manner.

In the exemplary embodiment illustrated in FIGS. 12 and 13 of the indicator element 18 and the transmission element that corresponds to a great extent to those parts in FIGS. 8 and 9, the helical compression spring 17 is fixedly connected at one of its ends to the indicator element 18 and comprises on its other end a clip 24. The helical compression spring 17 can be clipped by means of the clip 24 into a corresponding recess of the handle 9.

In the exemplary embodiment in FIGS. 14 and 15 of the indicator element 18 and transmission element, the indicator element 18 corresponds to the indicator element 18 illustrated in FIGS. 12 and 13.

A transmission element embodied as a meander spring element 25 in the form of a meandering leaf spring is manufactured in one piece with the indicator element 18 as an injection molded part in a synthetic material and comprises a clip 24 at its end remote from the indicator element 18, corresponding to FIGS. 12 and 13.

The transmission elements of the various exemplary embodiments embodied as spring elements are resistant to deformation in their extension between the indicator element 18, 18' and the handle 9 to such an extent, that as the handle 9 performs a pivot movement said transmission elements, functioning as a push rod transmit this movement to the indicator element 18, 18' and displace it in its guide 19.

Here, when the handle 9 is located in the locked position (FIG. 1), the indicator element 18, 18' is located completely in a non-indication position in which it is recessed in the guide 9 and when the handle is located in the unlocked position (FIGS. 2, 6, 7, 9, 10), said indicator element is located in an indication position in which it protrudes outward partially out of the guide 9.

If an external force is applied to the indicator element 18, 18' that is located in its indication position, the indicator element 18, 18' is displaced during the elastic deformation of the transmission elements, embodied as spring elements, completely into the guide 9 and is protected therein.

The handle 9 remains in its unlocked position.

If the external force is removed, the indicator element 18, 18' moves back into its indication position by virtue of the transmission element embodied as a spring element.

As the handle 9 is pivoted out of the unlocked position into the locked position, the transmission element once again functions as a pull rod that is resistant to deformation and pulls the indicator element 18, 18' into the guide 9 into its non-indication position.

The invention claimed is:

1. An indicator apparatus for signaling that a foldable backrest of a seat, in a motor vehicle, is not locked, the apparatus comprising:
   a handle that can be pivoted between a locked position and an unlocked position about a pivot axis;
   a locking apparatus having a catch that by working of the handle can be moved between a blocked position and an unblocked position; and
   an indicator element guided in a guide between a non-indication position in which the indicator element is recessed in the guide and an indication position in which the indicator element protrudes outward partially out of the guide, and is movable by a transition element in a displaceable manner, wherein the indicator element can be moved against a spring force into its non-indication position by the application of force to its outer end region that protrudes out of the guide when the handle is located in the unlocked position, wherein the transmission element comprises a spring element that is fixedly connected both to the handle and also to the indicator element, the spring element is resistant to deformation as the indicator element is moved in a displaceable manner by the handle, the spring element, functioning as a push rod, is configured to move the indicator element in a displaceable manner from the non-indicating position into the indication position, the spring element, functioning as a pull rod, is configured to move the indicator element in a displaceable manner from the indication position into the non-indication position, and the spring element can be deformed in an elastic manner when the handle is located in the unlocked position and the indicator element is moved out of the indication position into the non-indication position.

2. The indicator apparatus as claimed in claim 1, wherein the transmission element engages the handle at a radially spaced disposition with respect to the pivot axis.

3. The indicator apparatus as claimed in claim 2, wherein the spring element is a meander spring element manufactured in a resilient-elastic material.

4. The indicator apparatus as claimed in claim 2, wherein the spring element comprises two mutually approximately symmetrical bending rods that are fixedly connected to each other at their two end regions and in the middle region of their longitudinal extension are spaced apart from each other forming an ear shape.

5. The indicator apparatus as claimed in claim 1, wherein the indicator apparatus is arranged in a housing that comprises the guide of the indicator element.

6. The indicator apparatus as claimed in claim 1, wherein the handle-side end of the spring element is connected to the handle by a push/pull element.

7. The indicator apparatus as claimed in claim 6, wherein the push/pull element is connected in an articulated manner to the handle in such a manner as to be able to pivot about an articulated joint axis that is in parallel with the pivot axis of the handle.

8. The indicator apparatus as claimed in claim 1, wherein the indicator element is at least partially in a warning color.

9. The indicator apparatus as claimed in claim 1, wherein the indicator element can be deformed in an elastic manner transversely with respect to its direction of movement.

10. The indicator apparatus as claimed in claim 1, wherein the indicator element is completely in a warning color.

\* \* \* \* \*